United States Patent
Toyozawa et al.

(10) Patent No.: US 6,445,154 B1
(45) Date of Patent: Sep. 3, 2002

(54) METHOD FOR DETECTING SYNCHRONOUS MOTOR ROTOR MAGNETIC POLE POSITION

(75) Inventors: Yukio Toyozawa, Kumamoto (JP); Naoto Sonoda, Kumamoto (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/655,876

(22) Filed: Sep. 6, 2000

(30) Foreign Application Priority Data

Jul. 9, 1999 (JP) .......................................... 11-252662

(51) Int. Cl.$^7$ .............................. H02P 1/46; H02P 3/18; H02P 5/28; H02P 7/36
(52) U.S. Cl. ...................................................... 318/700
(58) Field of Search ................................ 318/700–724

(56) References Cited

U.S. PATENT DOCUMENTS

| | | | |
|---|---|---|---|
| 5,585,709 A | * | 12/1996 | Jansen et al. |
| 5,874,821 A | * | 2/1999 | Monleone |
| 6,020,665 A | * | 2/2000 | Maurio et al. |
| 6,184,647 B1 | * | 2/2001 | Oguro et al. |

* cited by examiner

*Primary Examiner*—Jeffrey Donels
(74) *Attorney, Agent, or Firm*—Staas & Halsey LLP

(57) ABSTRACT

First, a direct current is supplied to an excitation phase at 180 degrees, and stopped when the rotor rotates. If it is forward rotation, the rotor magnetic pole position is in the range from 180 to 360 degrees, and the starting point thereof, 180 degrees, is treated as the estimated magnetic pole position θ. If rotation is in reverse, on the other hand, the magnetic pole position lies in the range from 0 to 180 degrees, and the starting point thereof, 0 degrees, is treated as the estimated magnetic pole position θ. A reverse current is supplied, and the rotor is returned to its original position. A phase quantity β of ½ of the width of a detected range (this time it will constitute 90 degrees) is added to an estimated magnetic pole position, and the result is treated as an excitation phase. The same processing is carried out thereafter, and the range in which the magnetic pole position is estimated to exist is steadily narrowed. Repetition is performed, and the width of the range in which the magnetic pole position exists is made smaller 90, 45, 22.5 . . . . The magnetic pole position can be detected without-causing the rotor to move noticeably.

7 Claims, 6 Drawing Sheets

METHOD FOR DETECTING SYNCHRONOUS MOTOR ROTOR MAGNETIC POLE POSITION

BACKGROUND OF THE INVENTION

1. Field of the Invention

The present invention relates to a method for detecting the position of the rotor magnetic pole of a synchronous motor, which is used as a drive source in a variety of machines and devices, such as machine tools controlled by numerical control (NC) devices, industrial machines, robots, and so forth.

2. Description of the Related Art

A synchronous motor can generate torque by supplying an electric current to a stator excitation phase, which possesses a certain angle (a 90-degree electrical angle) relative to the position of a rotor magnetic pole. To excite a stator excitation phase such that it possesses a 90-degree angle relative to this rotor magnetic pole position requires an understanding of the physical relationship between the rotor magnetic pole position and a stator excitation phase. Ordinarily, the detection of this magnetic pole position is detected by a sensor, such as an encoder or resolver mounted to the rotor of an electric motor.

Because the absolute position of a rotor is needed to detect this magnetic pole position, a high-priced encoder, resolver or the like is required. Further, when mounting a sensor to an electric motor, it becomes necessary to align the sensor with the motor magnetic pole position, but the problem is that this alignment is difficult, and consequently causes motor production efficiency to deteriorate, and is costly.

As a method of solving this problem, in the past, there was used a detection method, which applies direct current electrical current to the 0 degree stator excitation phase, making the place where the rotor stops the rotor magnetic position. However, it is extremely dangerous to employ this method in a state in which a motor is mounted to a machine because at detection time the rotor is moving in any direction at an electrical angle of up to 180 degrees.

OBJECTS AND SUMMARY OF THE INVENTION

An object of the present invention is to provide a synchronous motor rotor magnetic pole position detection method, which enables a rotor magnetic pole position to be detected safely and easily.

To achieve the above-mentioned object, the present invention is a rotor magnetic pole position detection method for a synchronous motor, which comprises a magnetic pole-equipped rotor, an exciting winding-equipped stator, and a rotor position-detecting sensor, and repeats the following series of steps from (a) to (d).

(a) A step for supplying electric current to a prescribed excitation phase of the stator, (b) A step for acquiring the direction of movement of a rotor by the above-mentioned application of electric current, (c) A step for estimating the rotor magnetic pole position based on the acquired direction of movement, (d) A step for specifying a prescribed excitation phase at which electric current is to be supplied the next time based on the estimated magnetic pole position of the above-mentioned rotor.

Furthermore, the present invention is constituted so as to comprise a step for writing to a non-volatile memory the difference between a rotor magnetic pole position ultimately obtained by repeating the above-mentioned series of steps from (a) to (d), and a rotor position detected by the sensor at that time.

In the above-mentioned Step (c), a rotor magnetic pole position is estimated based on rotor movement direction in accordance with a phase range that is divided into two parts at an excitation phase at which electric current is supplied. Further, in the above-mentioned Step (d), there is specified a prescribed excitation phase, which further divides a phase range in which it is estimated that a rotor magnetic pole position is located. By repeating the above-mentioned Steps (a)–(d), a rotor magnetic pole position is ultimately detected by steadily narrowing the phase range in which the rotor magnetic pole position is estimated to exist.

Further, to reduce the movement of the rotor, the present invention is constituted such that after the above-mentioned Step (b), an electric current of a reverse polarization to the electric current supplied in Step (a) is supplied to a prescribed excitation phase, returning the position of the rotor to the original position.

Furthermore, a rotor magnetic pole position can be determined more accurately by adding the amount of rotor movement during detection of the above-mentioned rotor magnetic pole position, as a correction quantity, to the above-mentioned estimated rotor magnetic pole position. Because generated torque declines as the stator excitation phase and phase of the rotor magnetic pole position draw nearer, the present invention is constituted such that the electric current value supplied to the above-mentioned prescribed magnetic pole position is changed at the time of repetition.

According to the method of the present invention, because a rotor magnetic pole position can be detected without rotating the rotor very much, it is possible to detect a rotor magnetic pole position even in a state in which a synchronous motor is mounted to a machine, thus enabling a rotor magnetic pole position to be detected safely and easily.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
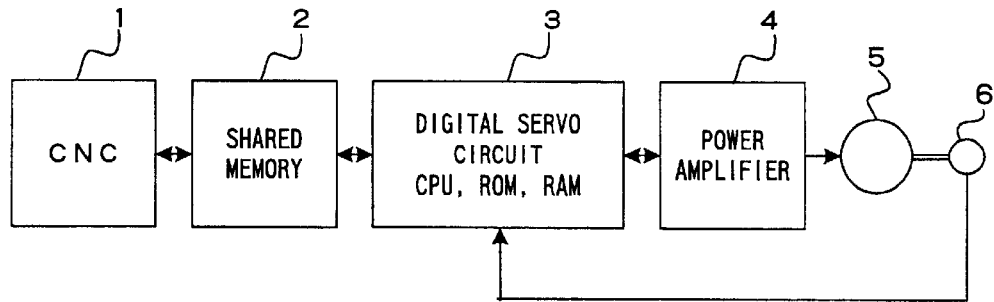
FIG. 1 is a block diagram of a servo motor control system to which the method of the present invention is supplied.

FIG. 1 is a block diagram of a servo motor control system of a machine tool or the like controlled by CNC (computer numerical control) to which the method of the present invention is supplied.

CNC 1 performs the program-based distribution of movement commands to a servo motor 5, which constitutes a synchronous motor that drives the various axes of a machine, and this distributed movement command is written to shared memory 2.

A digital servo circuit 3, which controls the servo motor, is constituted from a processor (CPU), ROM, RAM, and non-volatile memory (RAM), and performs servo control in accordance with software. The digital servo circuit 3 processor performs position and velocity loop control using a movement command written to shared memory 2, and the servo motor rotational position and velocity, which are fed back from an encoder 6 that detects a rotor position of a motor, which will be described hereinbelow, and also performs current loop control based on a feedback current, so that the processor performs servo control and drives and controls via a power amplifier 4 the servo motor 5, which is constituted from a synchronous motor.

Figure 2:
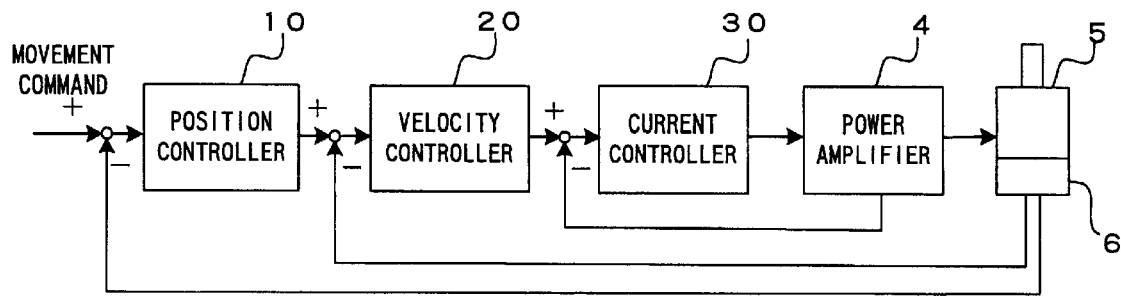
FIG. 2 is a functional block diagram of servo control executed by a digital servo circuit in the system shown in FIG. 1.

FIG. 2 is a functional block diagram in which the above-mentioned digital servo circuit 3 executes the digital servo software to be executed each prescribed sampling period.

A position controller 10 determines the deviation of a position by subtracting an encoder 6-supplied position feedback movement quantity from a movement command sent from a CNC 1 via a shared memory 2, and also outputs a velocity command by multiplying this position deviation by a position loop gain. A velocity controller 20 determines velocity deviation by subtracting an encoder (sensor) 6-supplied velocity feedback signal from the velocity command outputted from this position controller 10, and then, using this velocity deviation, carries out proportional/integral control, and outputs a torque command. A current controller 30 performs current loop processing based on the torque command outputted from the velocity controller, the actual current, which is detected and provided as feedback by a current detector, and also the servo motor 5 rotor position detected by the encoder 6, determines the servo motor U-, V-, and W-phase voltage commands, and outputs these determined voltage commands to a power amplifier 4 constituting an inverter and so forth. In the power amplifier 4, a current for each phase of the servo motor 5 is determined based on the above-mentioned voltage commands, and supplied to each phase.

Figure 3:
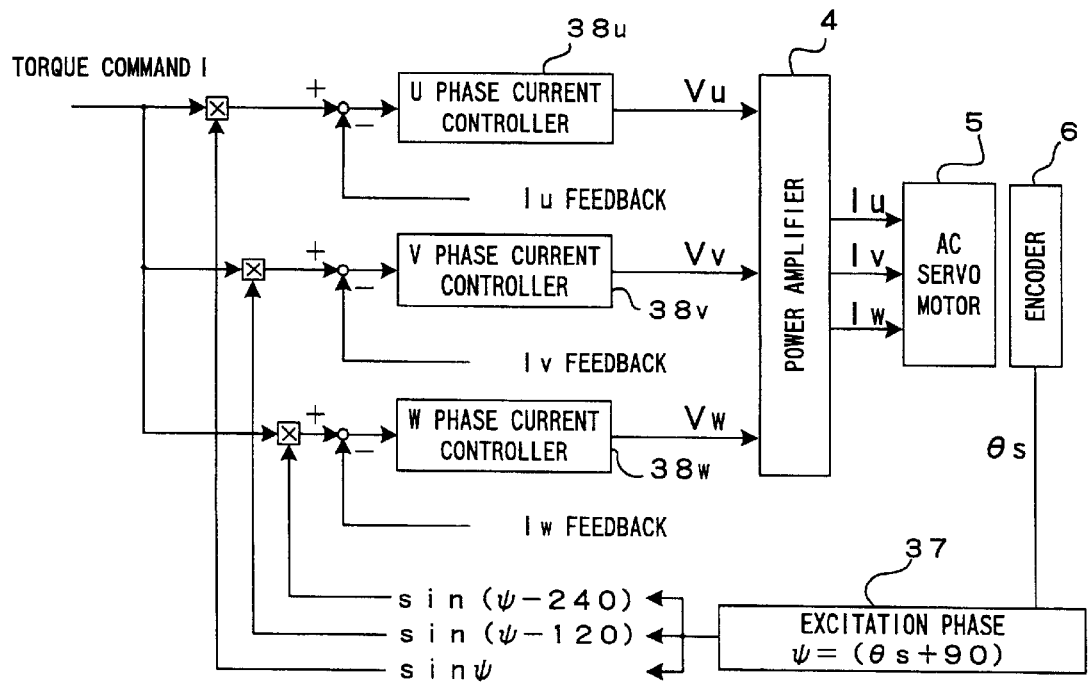
FIG. 3 is a functional block diagram of a conventional current controller.

FIG. 3 is a functional block diagram of the processing, which the above-mentioned current controller 30 executed in the past.

This current controller 30
(1) determines a current command for each phase by multiplying by the torque command (current command) outputted from the velocity controller 20 a sine wave that deviates $2\pi/3$ for each of the U-, V-, and W-phase from an excitation phase $\psi$ (37), which adds 90 degrees to the phase $\theta s$ of a rotor position detected by the encoder 6,
(2) determines the current deviation by subtracting from this current command the actual current Iu, Iv, Iw of each phase detected by the current detector,
(3) outputs to the power amplifier 4 the command voltage Vu, Vv, Vw of each phase by performing proportional/integral control via each phase current controller 38u, 38v, 38w, and then
(4) the power amplifier 4 performs PWM (pulse width modulation) control via an inverter and the like, and applies each phase current Iu, Iv, Iw to the servo motor 5, driving this servo motor 5.

Figure 4:
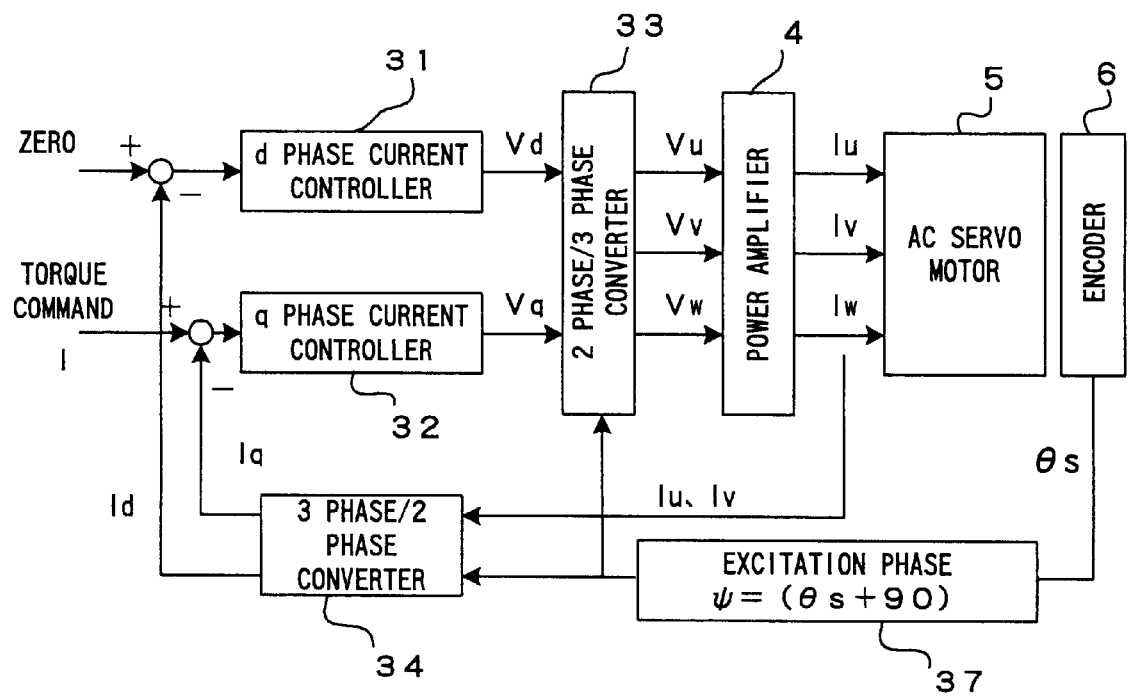
FIG. 4 is a functional block diagram of a conventional current controller, which carries out d-q conversions.

Further, FIG. 4 is a functional block diagram of a conventional current controller 30, which performs current control by carrying out d-q conversion.

With this current controller 30,
(1) The d-phase current command is treated as 0, and the q-phase current command is treated as torque command I outputted from the velocity. controller 20.
(2) A converter 34 converts a 3-phase current to a 2-phase current based on the actual current of each phase detected by the current detector (these can be the actual currents of any two phases, and in the figure, are the actual currents of the U and V phases Iu, Iv), and the excitation phase $\psi$ (37), which adds 90 degrees to the rotor position phase $\theta s$ detected by the encoder 6, and determines and outputs the currents Id and Iq of the d phase and q phase.
(3) Current deviations are determined by subtracting currents Id, Iq of the above-mentioned d phase and q phase, respectively, from the current commands of each of the above-mentioned d phase and q phase, and these current deviations are used to perform proportional/integral processing in a d-phase current controller 31, and a q-phase current controller 32, and to determine d-phase command voltage Vd and q-phase command voltage Vq.
(4) Converter 33 converts from the 2-phase (d phase and q phase) command voltages Vd and Vq determined thereby to 3-phase (U, V, W phases) command voltages Vu, Vv and Vw, and outputs the converted command voltages Vu, Vv and Vw to the power amplifier 4.
(5) The power amplifier 4 determines the current Iu, Iv and Iw to be supplied to each phase of the servo motor 4 U, V and W phases, applies the current of each of these phases Iu, Iv and Iw to the servo motor 5, and drives and controls the servo motor 5.

As described hereinabove, the current controller 30 in a servo control system, which uses a synchronous motor as a servo motor, as shown in FIG. 3 and FIG. 4, determines the voltage commands Vu, Vv and Vw to each servo motor excitation phase based on an excitation phase $\psi$, which adds 90 degrees to the phase $\theta s$ of a rotor position detected by an encoder or other such sensor 6. For a rotor position phase $\theta s$ to be detected by an encoder or other such sensor 6, an excitation phase reference of an exciting current supplied to the stator, and the rotor position detected by the encoder must constitute a prescribed physical relationship.

If the current vector is treated as I, and the magnetic flux vector is treated as $\phi$, the torque T generated by the synchronous motor is $$T = a\,(I \times \phi) \qquad (1)$$

Also, a is a constant, and × represents a vector product. The size of this torque is $$|I|\,|\phi|\sin\alpha \qquad (2)$$

Furthermore, a is the angle formed by the current vector I and the flux vector $\phi$, and the angle between the excitation phase and the rotor magnetic pole position. Accordingly, in the past, a direct current was supplied to the 0 degree stator excitation phase, the rotor was made to rotate, the position at which rotor rotation stopped, that is, the above-mentioned position of either α=0 degrees or α=180 degrees, was detected, and a rotor position relative to a excitation phase reference was detected. However, as mentioned hereinabove, this method had the drawback of the rotor rotating a maximum of 180 degrees.

Accordingly, the present invention provides a method, which detects the rotor position relative to the stator excitation phase reference by only moving the rotor slightly.

When a synchronous motor is driven, the size of the torque T thereof is $|I| |\phi| \sin \alpha$ according to the above-mentioned formula (2), and the direction of rotation thereof is determined by the angle α formed by the current vector I and the flux vector φ. If this angle α is within the range from 0 to 180 degrees, then sin α>0, and the rotor rotates in the forward direction. If a is within the range from 180 to 360 degrees, then sin α<0, and the rotor rotates in the reverse direction.

By making use of this, in this embodiment, first, direct current is supplied to the 180-degree stator excitation phase, and the direction of rotation of the rotor is detected. If it rotates in the forward direction, the rotor magnetic pole position (position of magnetic flux φ) falls within the range from 180 to 360 degrees of the stator excitation phase, and conversely, if the rotor rotates in the reverse direction, the rotor magnetic pole position falls within the range from 0 to 180 degrees.

Next, a direct current is similarly supplied to an intermediate excitation phase within the range (either from 180 to 360 degree, or from 0 to180 degree) where a rotor magnetic pole position is included, the direction of rotation of the rotor is detected, and the range where the rotor magnetic pole position is included is detected. Thereafter, these steps are repeated, making the range where the rotor magnetic pole position is included smaller successively, so that the rotor magnetic pole position is finally detected.

For example, it is supposed that a rotor magnetic pole position was at the 350-degree stator excitation phase. Firstly, when a current is supplied to the 180-degree excitation phase, this is α=350−180=170, and sin 170 >0, so the rotor rotates in the forward direction, and the rotor magnetic pole position is determined to exist in the range from 180 to 360 degrees.

Next, a direct current is supplied to the excitation phase of 270 (=(180+360)/2) degrees, which divides the range from 180 to 360 degrees in two. Then α=350−270=80, and sin 80 >0, so the rotor rotates in the forward direction. In accordance therewith, the rotor magnetic pole position is determined to be in the range from 270 to 360 degrees.

Accordingly, a direct current is supplied to the excitation phase of 315 degrees (=(270+360)/2) of midway in the range from 270 to 360 degrees. In this case, too, α=35, and the direction of rotation constitutes the forward direction. Thus, a direct current is supplied to the excitation phase of 337.5 degrees (=(315+360)/2) of midway in the range from 315 to 360 degrees. In this case, too, α=12.5, and the rotor rotates in the forward direction. Thus, a direct current is supplied to the excitation phase of 348.75 degrees (=337.5+360)/2) of midway between 337.5 degrees and 360 degrees. In this case, too, rotation is in the forward direction. Accordingly, a direct current is supplied to the excitation phase of 354.375 degrees (=(348.75+360)/2) of midway between 348.75 degrees and 360 degrees. At this time, α=350−354.375=−4.375, and sin <0, so the rotor rotates in the reverse direction. Therefore, as for the phase to be excited next, a direct current is supplied to the excitation phase of 351.5625 degrees (=348.75 degrees+354.375 degrees)/2) of midway in the range from 348.75 to 354.375 degrees, and the direction of rotation is detected.

Thereafter, the range in which the rotor magnetic pole position is determined to exist in this manner is steadily made narrower by performing range determinations either predetermined number of times or until the rotor stops rotating so that the rotor magnetic pole position is determined.

Figure 5:
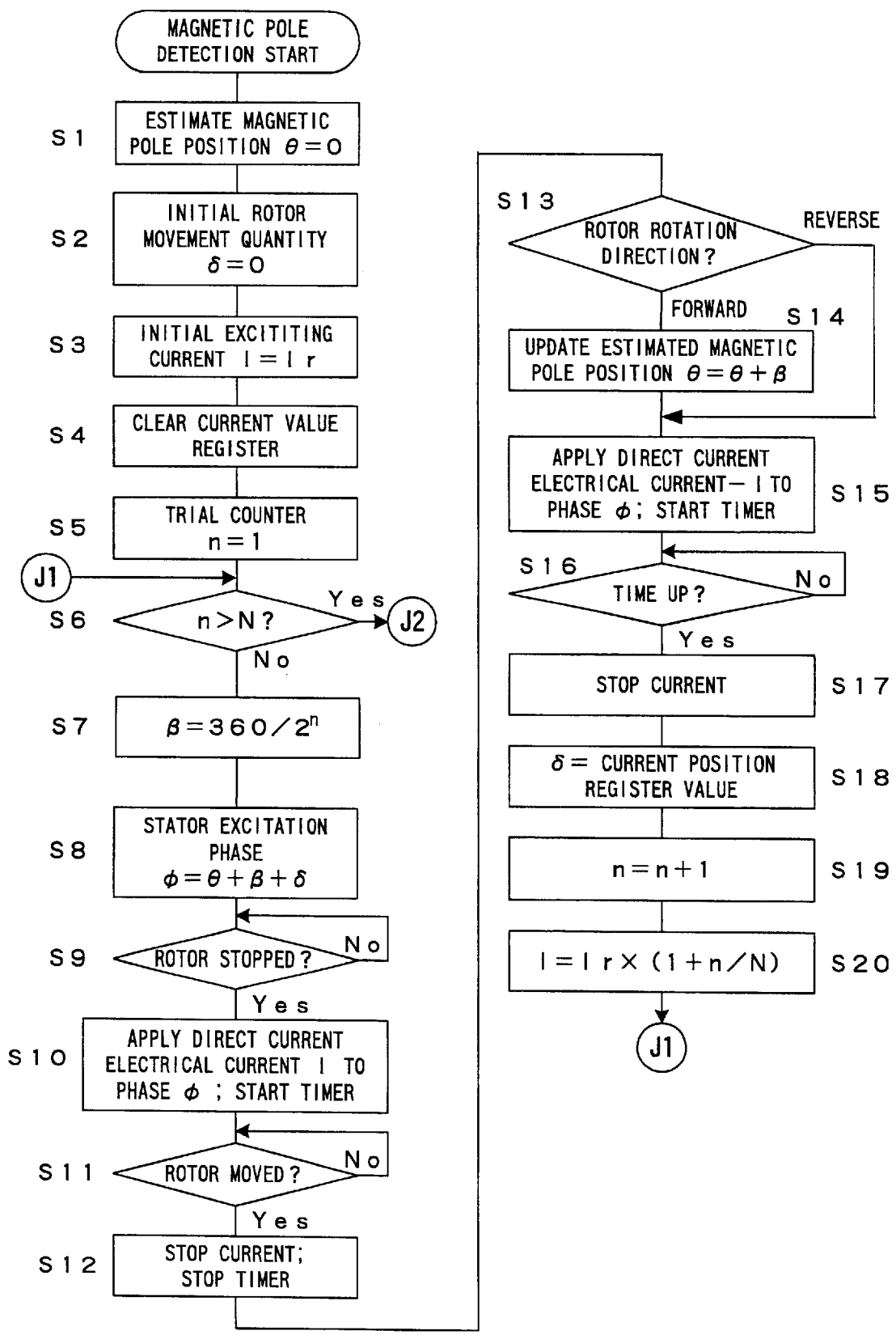
FIG. 5 is a flowchart of a magnetic pole position detecting process according to the present invention executed by the processor of the digital servo circuit of FIG. 1.
Figure 6:
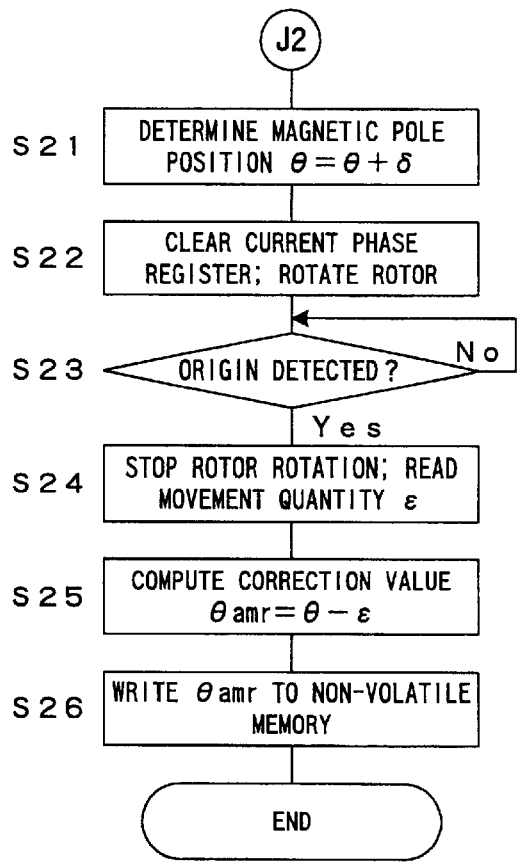
FIG. 6 is a continuation of the flowchart shown in FIG. 5.

FIG. 5 and FIG. 6 are flowcharts of magnetic pole position detection processing executed by the processor of the digital servo circuit 3 of this embodiment. When the system is powered ON, and a magnetic pole position detection command is inputted from CNC 1 inputting means, the digital servo circuit 3 processor commences the processing of FIG. 5 and FIG. 6.

Firstly, the processor sets an initial value of "0" in the register that stores the estimated pole position θ, sets "0" as the initial rotor movement quantity in the register that stores rotor movement quantity δ, and sets a value Ir, which is set as the initial exciting current, in the register that stores the direct current I for excitation (Steps S1–S3).

The value of the current value register, which stores the position (rotor position) of the servo motor (synchronous motor) 5 based on a signal from the encoder 6, is cleared to "0" (Step S4), and a trial counter n, which totals the number of repetitions of processing of Step S6–Step S20 that will be described hereinbelow, is set to "1" (Step S5).

And then, a determination is made as to whether or not the value of the trial counter exceeds a set number of repetitions N (Step S6), and when it does not exceed this set number, 360 degrees is divided by $2^n$, and a phase quantity β, ½ of the phase width of an estimated rotor magnetic pole position range, is determined. Initially, the rotor magnetic pole position is estimated to be within the entire range of 0 to 360 electrical angle, and because the trial counter n is set to "1," it is determined that a phase quantity β, which is ½ of the phase width of an estimated range, is 180 degrees (Step S7).

Next, the stator excitation phase φ is determined by adding the phase quantity β of ½ of the phase width of an estimated range and a rotor movement quantity δ to the magnetic pole position θ estimated up until the current point in time (one end of an estimated range, and for this embodiment, the side that is the starting point, and is a small phase angle) (Step S8). Initially, since θ=0, β=180 degrees, and δ=0, the stator excitation phase φ is determined as "180 degrees."

A determination is made as to whether or not the rotor is stopped (Step S9). This determination is made based on whether or not a feedback pulse was outputted from the encoder 6. And if the rotor is stopped, the direct current exciting current I (set value Ir at the start) stored in a register is supplied to the excitation phase φ determined in Step S8, and, in addition, a timer is started (Step S10).

Figure 7:
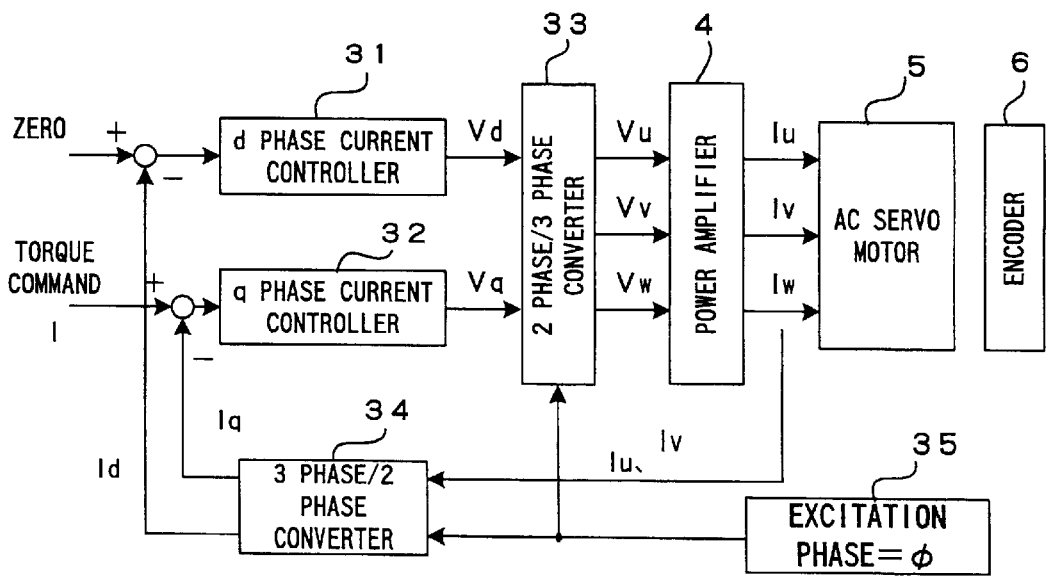
FIG. 7 is a functional block diagram in the case where a current controller is executing a magnetic pole position detecting process according to the present invention.

FIG. 7 is a functional block diagram of current control, which controls a current by performing d-q conversion in the digital servo circuit in this rotor magnetic pole position detection processing. As shown in this FIG. 7, a direct current electrical current I stored in a register as a torque command is commanded, and the excitation phase φ determined in Step S8 is commanded as the excitation phase. Because the rest is the same as the conventional processing shown in FIG. 4, an explanation will be omitted.

Then, a determination is made as to whether or not the rotor moved. This determination is made based on whether or not a feedback pulse was outputted from the encoder. And if it is determined that the rotor moved, the exciting current is stopped, and the timer is stopped (Steps S11, S12). And the direction of rotation of the rotor is determined, and the range where the rotor magnetic pole position is included is determined (Step S 13).

As explained hereinabove, since the size of the torque generated by a synchronous motor when a current is supplied is expressed by formula (2), and the direction of this torque is forward (sin α>0) when the angle α formed by the flux vector and the current vector is between 0 degrees and 180 degrees, and is reverse (sin α<0) when same is between 180 degrees and 360 degrees. Accordingly, if a direct current electrical current I is supplied to excitation phase φ=180 degrees and the rotor rotates in the forward direction, then the rotor magnetic pole position is in the range from 180 to 360 degrees.

Accordingly, in this case, a phase quantity β (=180 degrees) of ½ of the phase width of an range in which the magnetic pole is estimated to be is added to an estimated magnetic pole position θ (=0), and a new estimated magnetic pole position θ (=180) is determined. That is, the phase of the starting point of an range in which the magnetic pole position is estimated to exist is stored as an estimated magnetic pole position θ. In this case, because the rotor magnetic pole position is estimated to be in the range from 180 to 360 degrees of the stator excitation phase, 180 degrees is stored as the new estimated magnetic pole position θ (Step S14).

Further, in Step S13, in a case in which it is determined that the rotor rotated in the reverse direction, the rotor magnetic pole position is in the range of 0 degrees–180 degrees, and at this time, the "0 degrees" starting point of the range of 0 degrees–180 degrees in which the rotor magnetic pole position is estimated to be is stored as it is without updating the estimated magnetic pole position θ.

Because the rotor rotated, in order to return the rotor to the original position, this time the rotor is started by supplying a direct current electric current –I with a reverse polarity to the excitation phase φ excited in Step S10, and by setting the timer to the elapsed time measured in Step S12 (Step S15). And then, when the timer time is up (Step S16), the exciting current stops (Step S17). That is, by supplying an exciting current that is of the same size but of a reverse polarity for the same amount of time, the rotor is moved in the reverse direction the extent that it moved, thus returning the rotor to its original position.

However, even if the rotor is returned to its original position, since there is no guarantee that it returned to the exact original position, the value of the current position register is read out, and this value is stored in a register as the quantity of rotor movement δ (Step S18). The trial counter n is incremented by "1" (Step S19), and the size of the direct current electrical current I for subsequent excitation is determined by carrying out the operation of formula (3) below (Step S20).

$$I = Ir \times (1 + n/N) \quad (3)$$

In the present invention, the phase where a direct current electrical current I is supplied and the rotor magnetic pole position are caused to steadily approach each other so as to correspond. That is, both the flux vector and the current vector are caused to draw closer to each other so as to form a match. Consequently, as shown in formula (1) and formula (2) mentioned hereinabove, the torque that rotates the rotor gradually diminishes if a direct current value I is held constant. Therefore, this embodiment is constituted such that the exciting direct current value I increases each time the phase for exciting the direct current electrical current changes (approaches the rotor magnetic pole position).

And then, processing returns to Step S6, and processing from Step S6 to Step S20 is repeatedly executed until the trial counter n exceeds the set value N.

In a case in which the trial counter n is "2," β=90 degrees, and the stator excitation phase φ of this time is determined by adding a phase quantity β of ½ of this estimated range width to the estimated magnetic pole position θ updated by the processing of Steps S13 and S14 of one time prior, and the rotor movement quantity δ determined by Step S18.

When the rotor moved in the forward direction in the previous operation, and the rotor magnetic pole position is estimated to be in the range from 180 to 360 degrees, as described hereinabove, 180 degrees is stored as the estimated magnetic pole position θ, a phase quantity β=90 degrees of ½ of the estimated range width is added thereto to make 270 degrees, and "270 degrees+δ", in which the rotor movement quantity δ is added to 270 degrees, constitutes the excitation phase of this time.

Further, in a case in which the previous rotor movement was in the reverse direction, the rotor magnetic pole position is in the range from 0 to 180 degrees, and 0 degrees is stored as the estimated magnetic pole position θ. A phase quantity β=90 degrees of ½ of the estimated range width is added thereto to make 90 degrees, and "90 degrees+δ", in which the rotor movement quantity δ is added to 90 degrees, constitutes the excitation phase of this time.

Supplying direct current I to stator excitation phase "270 degrees+δ," if it is determined in Step S13 that the rotor moves in the forward direction, then it is estimated that the rotor magnetic pole position is in the range from 270 to 360 degrees, and the estimated magnetic pole position is as θ=180+90=270 degrees. On the other hand, if it is determined that the rotor moves in a reverse direction, then it is estimated that the rotor magnetic pole position is in the range from 180 to 270 degrees, and the estimated magnetic pole position is θ=180 degrees.

Further, in case where the rotor rotates in the reverse direction when a direct current is supplied to an excitation phase of 180 degrees for the first time, if a direct current electrical current I is supplied to stator excitation phase "90 degrees+δ," and it is found in Step S13 that the rotor moves in a forward direction, then it is estimated that the rotor magnetic pole position is in the range from 90 to 180 degrees, and the estimated magnetic pole position is as θ=0+90=90 degrees. On the other hand, it is found that the rotor moves in the reverse direction, then it is estimated that the rotor magnetic pole position is in the range from 0 to 90 degrees, and the estimated magnetic pole position is as θ=0 degrees.

As described hereinabove, a direct current is supplied to the rotor, the range in which the rotor magnetic pole position is included is estimated, the width of this range is steadily reduced (in this embodiment, this range width is reduced by ½), and an estimated magnetic pole position θ is determined.

In this embodiment, when n=1, the width β of an range in which the rotor magnetic pole position is located can be reduced to ½ of 360 degrees, or 180 degrees, and it can be such that when n=2, β=90, when n=3, β=45, when n=4, β=22.5 . . . when n=10, β=0.3516, and when n=11, β=0.1758. And then, the starting point of the range thereof is determined as an estimated magnetic pole position θ. Accordingly, setting a set value N of an extent that is capable of achieving the accuracy required will determine an estimated magnetic pole position θ of the required accuracy.

Thus, in a case in which the value of the trial counter n exceeds the set value N in Step S6, processing advances to Step S21, and the final estimated magnetic pole position θ is determined by adding the amount of rotor movement δ to an estimated magnetic pole position θ. And then, the current position register is cleared, and the rotor is rotated in the reverse direction until a one rotation position signal is detected (Steps S22, S23). When a one rotation position signal is detected, the rotation of the rotor is stopped, and the movement quantity ε is read from the current position register (Step S24).

Figure 9A:
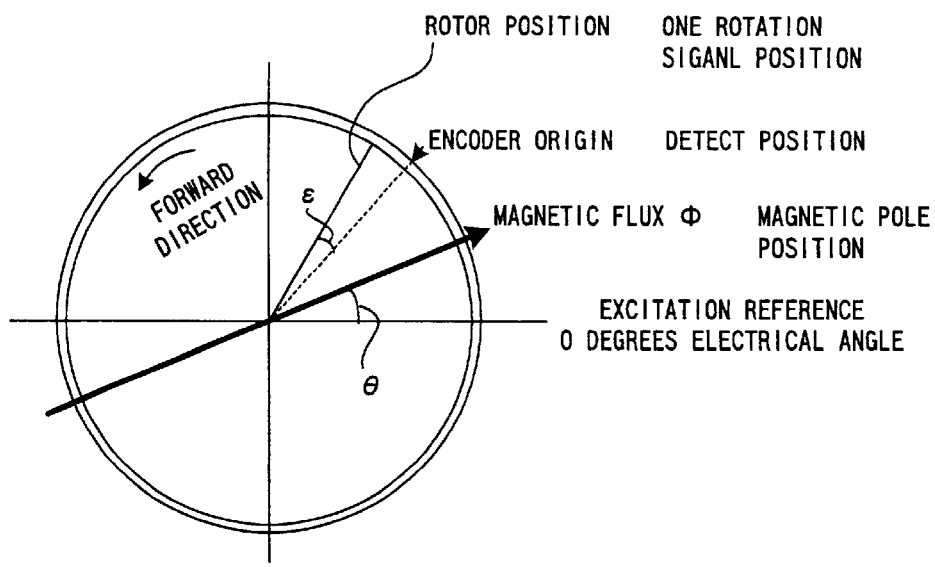
FIG. 9A–FIG. 9C are schematic diagrams illustrating the error (correction quantity) between a rotor magnetic pole position and a stator excitation reference.
Figure 9B:
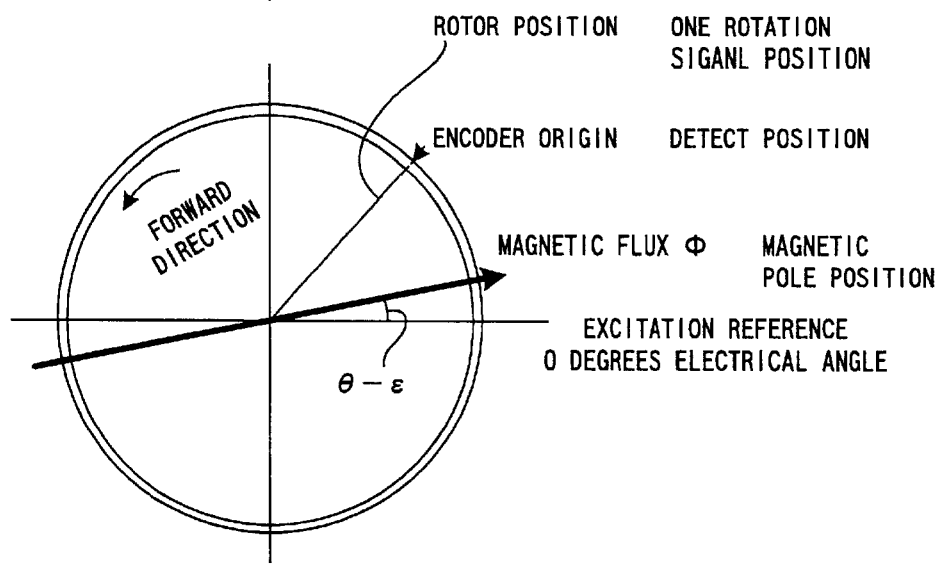

FIG. 9A and FIG. 9B are schematic diagrams of the processing of this Step S22–Step S24. The rotor magnetic pole position (flux position) θ is determined in the stator excitation phase in the processing up to Step S21. That is, it is found that the rotor magnetic pole position is at a phase position θ with respect to the excitation phase reference of the stator (electrical angle "0"). At this time, as shown in FIG. 9A, the origin of the encoder, that is, the point on the encoder mounted to the stator side for detecting the rotor position, and the one rotation signal position of the encoder mounted to the rotor side deviate by ε in the forward direction.

Accordingly, when the rotor is rotated in the reverse direction until the one rotation position signal is detected, and the value of the current value register reaches the movement quantity ε, as shown in FIG. 9B, the one rotation position signal is detected. At this time, the error between the rotor magnetic pole position and the stator excitation phase reference is (θ−ε). That is, when rotor position "0" is detected by the encoder, it is found that the magnetic pole position is in the position of the phase (θ−ε) relative to excitation phase reference. Furthermore, if the encoder 6 detects a movement quantity together with its sign, the above-mentioned error can be determined by only adding this movement quantity to the estimated magnetic pole position θ.

Accordingly, the above error (θ−ε) is computed, and is written into non-volatile memory as a correction quantity θamr (Steps S25, S26), and this magnetic pole position detection process is ended.

And then, in the case of ordinary servo control, a value obtained by adding the correction quantity θamr stored in this non-volatile memory to a position θs detected by the encoder 6 is detected as the excitation position.

Figure 9C:
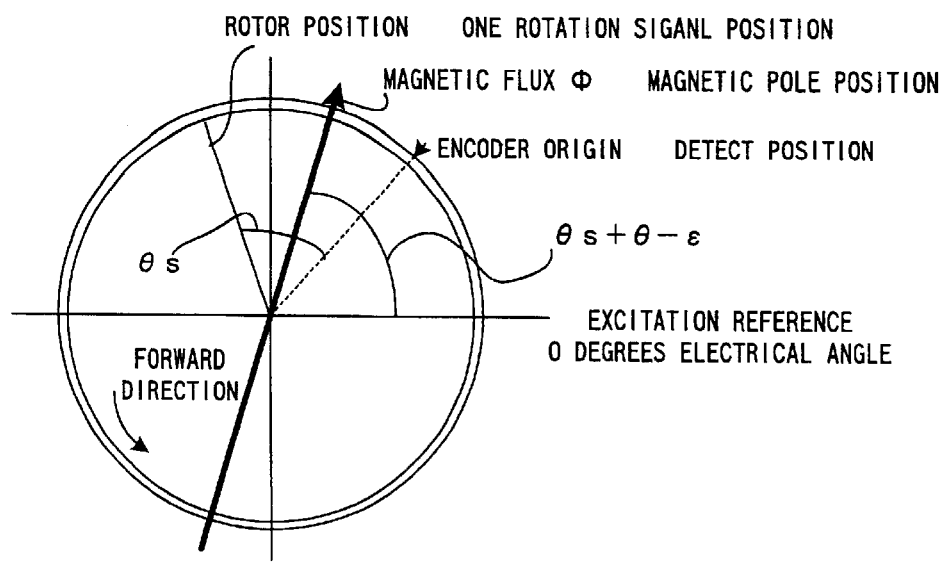

FIG. 9C is a schematic diagram of processing for determining an excitation phase in an ordinary motor drive. In a case in which θs was detected by the encoder 6, by adding the above-mentioned correction quantity θamr stored in memory to this detected value θs, a rotor magnetic pole position relative to a stator excitation reference (θs+θamr) is determined, and (θs+θamr+90), obtained by adding 90 degrees to this rotor magnetic pole position, is determined as the excitation phase ψ.

Figure 8:
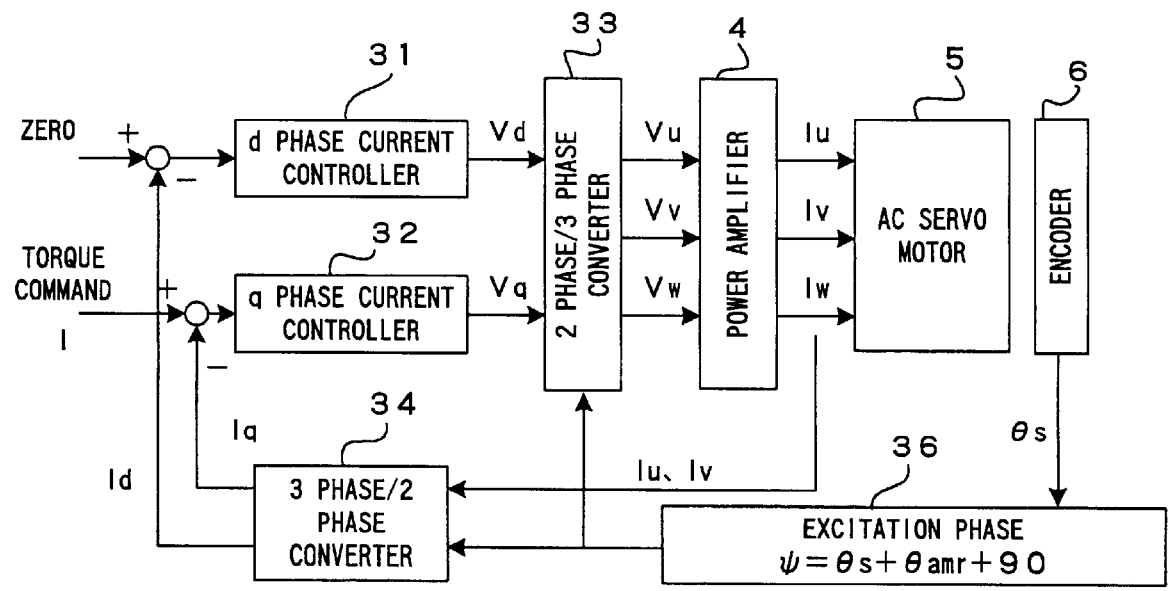
FIG. 8 is a functional block diagram in the case where a current controller is finding an excitation phase and executing current control based on a correction quantity determined by a magnetic pole position detecting process according to the present invention.

FIG. 8 is a functional block diagram of a case in which current is controlled by performing d-q conversion using a correction quantity θamr determined according to the present invention. The difference between this FIG. 8 and the prior art example shown in FIG. 4 lies solely in the fact that the excitation phase ψ constitutes (θs+θamr+90). Since the rest of the processing is the same as the processing of FIG. 4, an explanation thereof will be omitted.

Furthermore, in the above-mentioned embodiment, an incremental-type encoder 6 is used as the sensor for detecting the position of the rotor, but if an absolute value detector is utilized, since a position ε is detected by an absolute position detector when the magnetic pole position θ is determined in Step S21, a value (θ−ε), obtained by subtracting this detected position ε from the magnetic pole position θ determined in Step S21, can be stored as a correction quantity θamr.

Further, the present invention is such that a rotor magnetic pole position is detected as much as possible without moving the rotor, and consequently, in the above-mentioned embodiment, the rotor is moved only slightly. However, the present invention can also be constituted such that a torque sensor is mounted to a synchronous motor, the direction of the torque generated when a direct current is supplied to a prescribed excitation phase is detected (in this case, the rotor need not be rotated), and a rotor magnetic pole position is detected by the direction of the torque thereof.

Further, the above-mentioned embodiment is constituted such that Step S6 through Step S20 processing is executed until the trial counter n exceeds a set number N, but the present invention can also be constituted such that a repetition number N is not set, and processing is executed until the rotor stops rotating even when a direct current electrical current is supplied to a determined stator excitation phase. That is, in a case in which the rotor does not rotate in Step S11 (or a case in which torque is not generated), at that time, the excitation phase φ determined in Step S8 constitutes the estimated magnetic pole position θ.

Furthermore, the above-mentioned embodiment is constituted such that θamr determined as a correction quantity is stored in non-volatile memory, but it is not always necessary to store this correction quantity in non-volatile memory. In a case in which the correction quantity is not stored in non-volatile memory, when the system using this synchronous motor is powered ON, and the processing shown in FIG. 5 and FIG. 6 is executed, the correction quantity θamr determined in Step S26 can be stored in RAM instead of non-volatile memory.

What is claimed is:

1. A method for detecting a rotor magnetic pole position in a synchronous motor, said synchronous motor including a rotor in which magnetic poles are arranged, a stator in which exciting windings are provided and a sensor for detecting the position of this rotor, comprising:

supplying an electrical current to a prescribed excitation phase of said stator;

obtaining a direction of movement of said rotor upon said supply of said electrical current;

estimating a rotor magnetic pole position based on the obtained direction of movement; and specifying a prescribed excitation phase for supplying a subsequent electrical current based on the estimated magnetic pole position of said rotor repeating said supplying of the electrical current, obtaining the direction of movement, estimating the rotor magnetic pole position, and specifying the prescribed excitation phase for the subsequent electrical current, to detect the rotor magnetic pole position.

2. The method of claim 1, further comprising writing into non-volatile memory the difference between the detected rotor magnetic pole position and a rotor position detected by said sensor.

3. The method of claim 1, wherein, said estimating of the rotor magnetic pole position is based on the direction of rotor movement by virtue of a phase range, which was divided into two parts by an excitation phase to which an electrical current was supplied;

in said specifying of the prescribed excitation phase the prescribed excitation phase divides said phase range in which said rotor magnetic pole position is estimated to exist; and a rotor magnetic pole position is ultimately detected by steadily narrowing a phase range in which said rotor magnetic pole position is estimated to exist upon said repeating of said supplying of the electrical current, obtaining the direction of movement, estimating the rotor magnetic pole position, and specifying another prescribed excitation phase for supplying another electrical current.

4. The method of claim 1, wherein the value of an electrical current supplied to said prescribed excitation phase is changed at the point in time of said repetition.

5. A method for detecting a rotor magnetic pole position, comprising:

supplying an electrical current to a prescribed excitation phase of a stator;

specifying a prescribed excitation phase for supplying a subsequent electrical current to the stator based on a direction of movement of said rotor; and repeating said supplying of the electrical current and said specifying of the prescribed excitation phase for supplying the subsequent electrical current, to detect the rotor magnetic pole position.

6. The method of claim 5, wherein an electrical current of a polarity opposite the electrical current supplied in said supplying of the electrical current is supplied to the prescribed excitation phase upon supplying of the subsequent current.

7. The method of claim 5, wherein an amount of movement of the rotor, which moved during detection of said rotor magnetic pole position, is added to an estimated rotor magnetic pole position as a correction quantity.

* * * * *

UNITED STATES PATENT AND TRADEMARK OFFICE
CERTIFICATE OF CORRECTION

PATENT NO. : 6,445,154 B1
DATED : September 3, 2002
INVENTOR(S) : Yukio Toyozawa et al.

It is certified that error appears in the above-identified patent and that said Letters Patent is hereby corrected as shown below:

Title page,
Item [30], Foreign Application Priority Data, change "July 9, 1999" to -- September 9, 1999 --.
Item [57], ABSTRACT,
Line 9, change "without-causing" to -- without causing --.

Signed and Sealed this

Fourth Day of February, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,445,154 B1
DATED         : September 3, 2002
INVENTOR(S)   : Yukio Toyozawa et al.

It is certified that error appears in the above-identified patent and that said Letters Patent is hereby corrected as shown below:

Title page,
Item [30], Foreign Application Priority Data, change "July 9, 1999" to -- September 9, 1999 --.
Item [57], ABSTRACT,
Line 19, change "without-causing" to -- without causing --.

This certificate supersedes Certificate of Correction issued February 4, 2003.

Signed and Sealed this

Twenty-seventh Day of May, 2003

JAMES E. ROGAN
*Director of the United States Patent and Trademark Office*